(12) United States Patent
Bernhardt et al.

(10) Patent No.: US 7,209,924 B2
(45) Date of Patent: Apr. 24, 2007

(54) SYSTEM AND METHOD FOR HANDLING A CONTINUOUS ATTRIBUTE IN DECISION TREES

(75) Inventors: Jeffrey R. Bernhardt, Woodinville, WA (US); Pyungchul Kim, Snoqualmie, WA (US); C. James MacLennan, Redmond, WA (US); David Maxwell Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 10/185,029

(22) Filed: Jun. 28, 2002

(65) Prior Publication Data
US 2004/0002980 A1 Jan. 1, 2004

(51) Int. Cl.
G06F 7/14 (2006.01)
G06F 17/10 (2006.01)

(52) U.S. Cl. .................. 707/101; 707/102; 707/1; 706/59

(58) Field of Classification Search ........ 707/100–102; 706/60, 36
See application file for complete search history.

(56) References Cited
U.S. PATENT DOCUMENTS 5,694,524 A * 12/1997 Evans .................. 706/12
6,191,792 B1 * 2/2001 Iizuka et al. ............... 345/581
6,301,579 B1 * 10/2001 Becker ..................... 707/102
6,336,106 B1 * 1/2002 Evans ....................... 706/12

OTHER PUBLICATIONS

Dan Ventura et al., An Empirical Comparison of Discretization Methods, 1995, Proceedings of the Tenth International Symposium on Computer and Informaion Sciences, pp. 443-450.*
James Dougherty et al. Supervised and Unsupervised Discretization of Continuous Features, 1995, Machine Learning: Proceedings of the Twelfth International Conference, Morgan Kaufmann Publishers, 9 pages.*
Fayyad, U.M. et al., "On the Handling of Continuous-Valued Attributes in Decision Tree Generation", *Machine Learning*, Jan. 1992, 8(1), 87-102.
Kurgan, L., et al., "Discretization Algorithm that Uses Class-Attribute Interdependence Maximization", *Proceedings of the 2001 International Conference on Artificial Intelligence (IC-AI 2001)*, 2001, 980-987.

* cited by examiner

*Primary Examiner*—Paul Rodriguez
*Assistant Examiner*—Luke Osborne
(74) *Attorney, Agent, or Firm*—Woodcock Washburn LLP (57) ABSTRACT

Continuous attributes are used as input attributes in decision tree creation. Buckets are created by dividing the range of values for the continuous attribute into sub-ranges of equal extent. These buckets form initial partitions. Mergers of adjacent partitions are considered to determine score gains from such mergers, and the most useful mergers occur. The resulting partitions are used as the discretization of the continuous attribute for use as an input attribute.

42 Claims, 5 Drawing Sheets

SYSTEM AND METHOD FOR HANDLING A CONTINUOUS ATTRIBUTE IN DECISION TREES

FIELD OF THE INVENTION

The present invention relates to systems and methods for using an attribute with a range of values as an input attribute in training a decision tree. More specifically, the present invention relates to systems and methods for discretizing a continuous attribute for use in attribute tests in a decision tree.

BACKGROUND OF THE INVENTION

Data mining is the exploration and analysis of large quantities of data, in order to discover correlations, patterns, and trends in the data. Data mining may also be used to create models that can be used to predict future data or classify existing data.

For example, a business may amass a large collection of information about its customers. This information may include purchasing information and any other information available to the business about the customer. The predictions of a model associated with customer data may be used, for example, to control customer attrition, to perform credit-risk management, to detect fraud, or to make decisions on marketing.

To create and test a data mining model such as a decision tree, available data may be divided into two parts. One part, the training data set, may be used to create models. The rest of the data, the testing data set, may be used to test the model, and thereby determine the performance of the model in making predictions. Data within data sets is grouped into cases. For example, with customer data, each case corresponds to a different customer. All data in the case describes or is otherwise associated with that customer.

One type of predictive model is the decision tree. Decision trees are used to classify cases with specified input attributes in terms of an output attribute. Once a decision tree is created, it can be used predict the output attribute of a given case based on the input attributes of that case.

Decisions trees are composed of nodes and leaves. One node is the root node. Each node has an associated attribute test that splits cases that reach that node to one of the children of the node based on an input attribute. The tree can be used to predict a new case by starting at the root node and tracing a path down the tree to a leaf, using the input attributes of the new case in the attribute tests in each node. The path taken by a case corresponds to a conjunction of attribute tests in the nodes. The leaf contains the decision tree's prediction for the output attribute(s) based on the input attributes.

Figure 1:
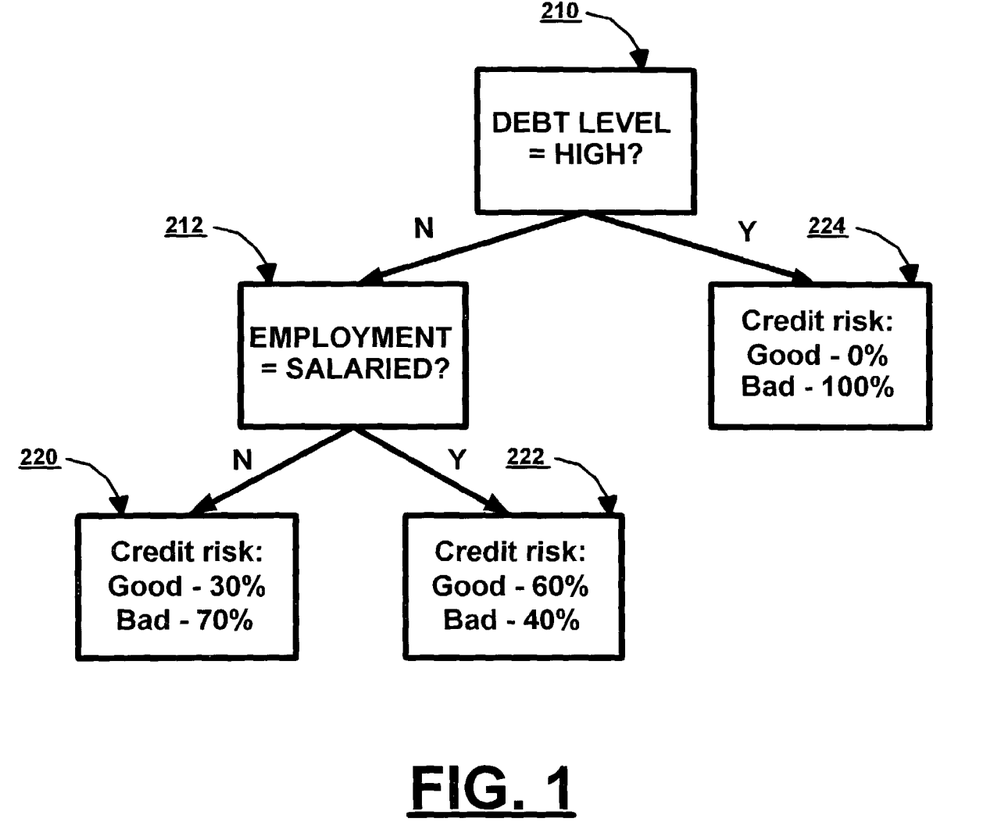
FIG. 1 is a block diagram depicting an exemplary decision tree.

An exemplary decision tree is shown in FIG. 1. In this decision tree, or example, if a decision tree is being used to predict a customer's credit risk, input attributes may include debt level, employment, and age, and the output attribute is a prediction of what the credit risk for the customer is. As shown in FIG. 1, decision tree 200 consists of root node 210, node 212, and leaves 220, 222 and 224. The input attributes are debt level and type of employment, and the output attribute is credit risk. Each node has associated with it a split constraint based on one of the input attributes. For example, the split constraint of root node 210 is whether debt level is high or low. Cases where the value of the debt input attribute is "high" will be transferred to leaf 224 and all other cases will be transferred to node 212. Because leaf 224 is a leaf, it gives the prediction the decision tree model will give if a case reaches leaf 224. For decision tree 200, all cases with a "high" value for the debt input attribute will have credit risk output attribute assigned to "bad" with a 100% probability. The decision tree 200 in FIG. 1 predicts only one output attribute, however more than one output attribute may be predicted with a single decision tree.

While the decision tree may be displayed and stored in a decision tree data structure, it may also be stored in other ways, for example, as a set of rules, one for each leaf node, containing a conjunction of the attribute tests.

Attributes for use as input attributes and output attributes can be n-state attributes. However, when the possible values for an attribute are continuous rather than falling in one of a predetermined number of states, the use of the attribute becomes complicated. For example, income data may be continuous, with an exact income number (e.g. $354,441.30) supplied in the data being used, rather than having a number of income states.

In order to create the tree, the nodes, attribute tests, and leaf values must be decided upon. Generally, creating a tree is an inductive process. Given an existing tree, all testing data is processed by the tree, starting with the root node, divided according to the attribute test to nodes below, until a leaf is reached. The data at each leaf is then examined to determine whether and how a split should be performed, creating a node with an attribute test leading to two leaf nodes in place of the leaf node. This is done until the data at each node is sufficiently homogenous. In order to begin the induction the root node is treated as a leaf.

To determine whether a split should be performed, a score gain is calculated for each possible attribute test that might be assigned to the node. This score gain corresponds to the usefulness of using that attribute test to split the data at that node. There are many ways to determine which attribute test to use using the score gain. For example, the decision tree may be built by using the attribute test that reduces the amount of entropy at the node. Entropy is a measure of the homogeneity of the data. The data at the node must be split into two groups of data which each are heterogeneous from each other.

In order to determine what the usefulness is of splitting the data at the node with a specific attribute test, the resultant split of the data at the node for each output attribute must be computed. This correlation data is used to determine a score which is used to select an attribute test for the node. Where the input attribute being considered is gender, for example, and the output attribute is car color, the data from the following Table 1 must be computed for the testing data that reaches the node being split:

TABLE 1

Correlation Count Table

|  | gender = MALE | gender ≠ MALE |
|---|---|---|
| car color = RED | 359 | 503 |
| car color ≠ RED | 4903 | 3210 |

As described above, data in a correlation count table such as that shown in Table 1 must be calculated for each combination of a possible input attribute test and output attribute description. This means that not only must the gender input attribute be examined to see how it splits the data at the node into red cars and non-red cars, but it must also examine how the gender input attribute splits the data at the node into blue cars and non-blue ones, green cars and non-green ones, etc., for every possible state of the "car color" variable.

In order to use a continuous attribute as an input attribute, correlation count table data must be produced. However, for the continuous attribute, calculating a correlation count table for each value of the continuous attribute would produce little useful information and be so computationally expensive as to be infeasible. Clearly, some way to handle continuous attributes to determine correlation count table calculations is required or such attributes can not be used as input attributes for a decision tree.

In the prior art, a method is used to discretize the values of a continuous attribute into a pre-determined number of ranges (e.g. four). This is done by finding one or more "cut point" values in the range of the continuous attribute. Thus, for a continuous attribute with values ranging from $A_{MIN}$ to $A_{MAX}$, a cut point $CP_1$ is determined. This divides the attribute into two ranges—$A_{MIN}$–$CP_1$ and $CP_1$–$A_{MAX}$. Doing this once more on each of the resultant ranges yields four ranges—$A_{MIN}$–$CP_2$, $CP_2$–$CP_1$, $CP_1$–$CP_3$, and $CP_3$–$A_{MAX}$. These ranges are determined by analyzing the sample data to determine the cut point with the best discretization based on the entropy of the data when divided at different possible cut points.

Once these ranges are determined, they are used as states of the attribute for the purpose of determining correlation counts and comparing attribute tests for use at a node. However, this sampling and discretization process requires an actual scan of the entire set of cases, sorting of the cases, and repetitive calculation of entropy over the possible ranges created by selecting different cut points. The determination of cut points is done relative to each node and so must be performed for each node. This involves high memory space and processing requirements. Additionally, the pre-determined number of ranges may not be appropriate for the data in all portions of the tree. For example, it may be better (in terms of tree score or prediction accuracy) to consider five logical ranges for the data, and information may be lost which otherwise would have been useful in making predictions. Using more cut points increases the number of ranges for which a correlation table must be constructed and evaluated, however, and therefore the computational overhead is also increased.

Because of the computational expense of determining cut points, and the loss of information associated with the prior art technique, attributes with a range of possible values are problematic. Using a continuous attribute as an input attribute can be resource intensive and may not capture much of the information contained in that attribute for the purposes of predicting the class attribute.

Thus, there is a need for a technique to allow the use of continuous attributes as input attributes in decision trees, with increased flexibility and reduced time and space requirements.

SUMMARY OF THE INVENTION

In view of the foregoing, the present invention provides systems and methods for using a continuous attribute as an input attribute to a decision tree. First, the range of the continuous attribute is divided into N equal-ranged buckets. (N may be constant, for example, 20, or may be tunable during the execution of the technique.) A split score is obtained by calculating the data for a correlation count table comparing each of the N buckets to the output attribute being examined. This score corresponds to the hypothetical situation where the given leaf node is replaced by an internal node (testing on the continuous attribute) that has one child corresponding to each of the N possible values. Then, in order to obtain a better split score, mergers of the buckets are considered. When mergers of buckets do not result in better or near-equivalent split scores, the merging of buckets is concluded. The remaining range divisions are considered as states for the continuous input attribute. The split scores of these states versus the output attributes and the split scores of all other input states versus the output attributes are considered. These scores are calculated and evaluated according to the prior art to determine which attribute test to use at the node.

BRIEF DESCRIPTION OF THE DRAWINGS

The system and methods for using continuous attributes in decision trees in accordance with the present invention are further described with reference to the accompanying drawings in which.

DETAILED DESCRIPTION OF THE INVENTION

Overview

As described in the background, conventionally, continuous attributes are used as input attributes and as output attributes in decision tree creation with limited utility. If continuous attributes are ignored or shoehorned into small numbers of sub-ranges, the informational content of the continuous attributes is lost. If continuous attributes are split into a large number of sub-ranges, these ranges will be computationally expensive to create and use.

In order to allow the use of continuous attributes as input or output attributes, the range of the continuous attribute is divided into N buckets. Merging adjacent buckets is considered to determine what score gain is caused by such mergers. According to one embodiment, a score loss of a small amount is acceptable to cause a merger, due to the computational efficiency of combining buckets. This continues until all mergers have been considered and rejected. The buckets that remain are then used as states for the continuous attribute, and an attribute test is selected according to the prior art.

Exemplary Computing Environment

Figure 2:
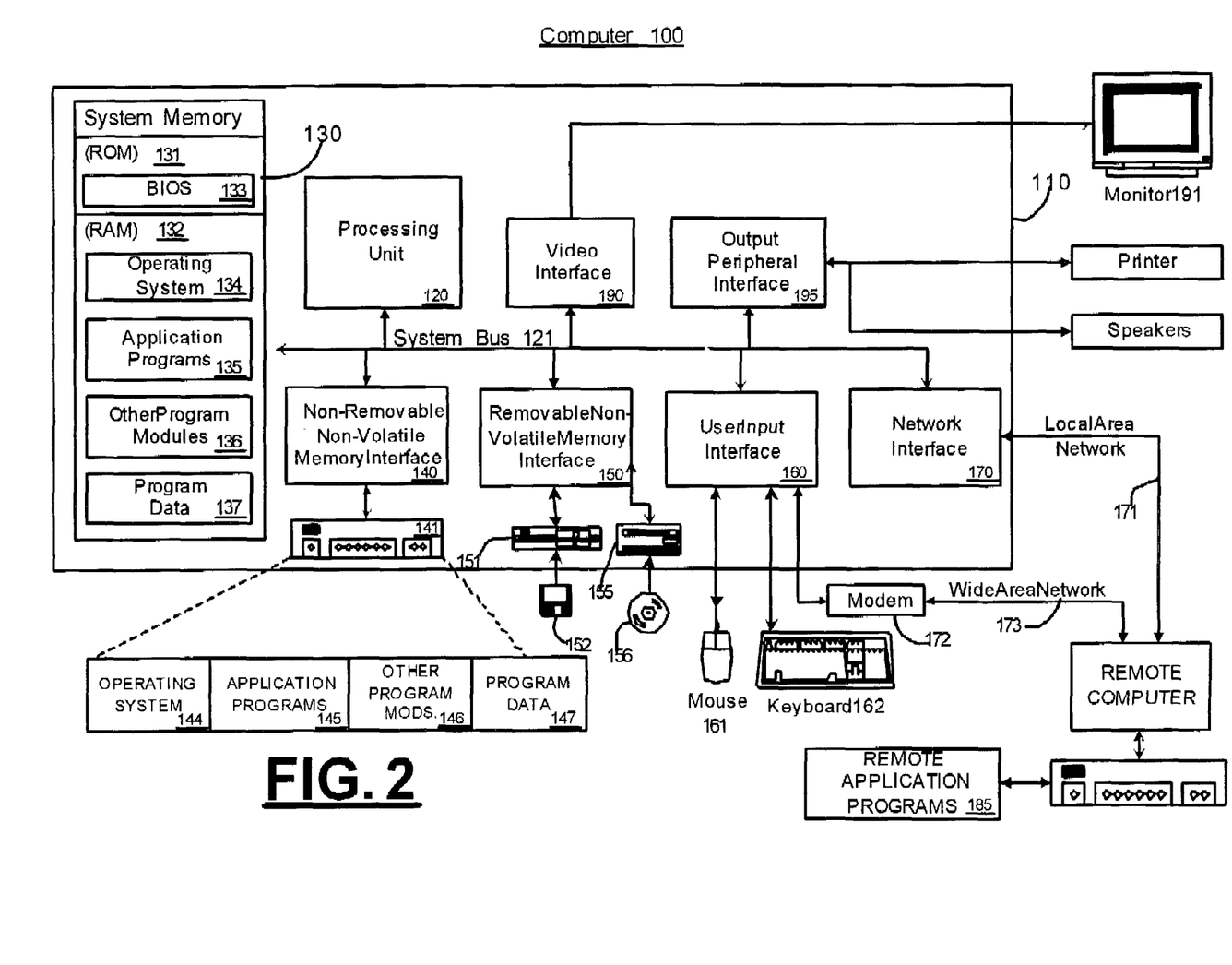
FIG. 2 is a block diagram of an exemplary computing environment in which aspects of the invention may be implemented.

FIG. 2 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 2, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Use of Continuous Attributes in a Decision Tree

In order to use a continuous attribute in a decision tree as an input attribute, the methods and systems of the invention first divide the range of the continuous attribute into equal-ranged buckets, and then selectively merges these buckets to provide sub-ranges. These sub-ranges are the discretized version of the continuous attribute—each sub-range is used as a state for the variable in the decision tree attribute test selection process.

In order to construct a decision tree, data at each node must be examined to determine which attribute test to use at that node. Possible attribute tests are considered with respect to the usefulness of the split they create. A reduction in the entropy, or homogeneity, in the data at the node is desirable.

Technique for Discretizing Continuous Input Attribute at a Node

When an attribute test is being determined and a continuous input attribute X is being considered for use in the attribute test, a local minimum value, $X_{MIN}$, and a local maximum value, $X_{MAX}$ is determined. These local minimum and local maximum are the minimum and maximum for the input attribute in the data at the node. See FIG. 3, step 310. According to one embodiment of the invention, the data at the node is sampled to determine a minimum value $X_{MIN}$ for X and a maximum value $X_{MAX}$ for X at the node. In other embodiments this is determined by consulting stored data about the attribute X and information about what subranges of the data are not present in the data. For example, if an attribute test in an ancestor node to the node being considered causes data with X>100 to another branch of the decision tree, the local $X_{MAX}$ at the node may be 100 even though X values in the entire training data set may exceed 100.

Figure 3:
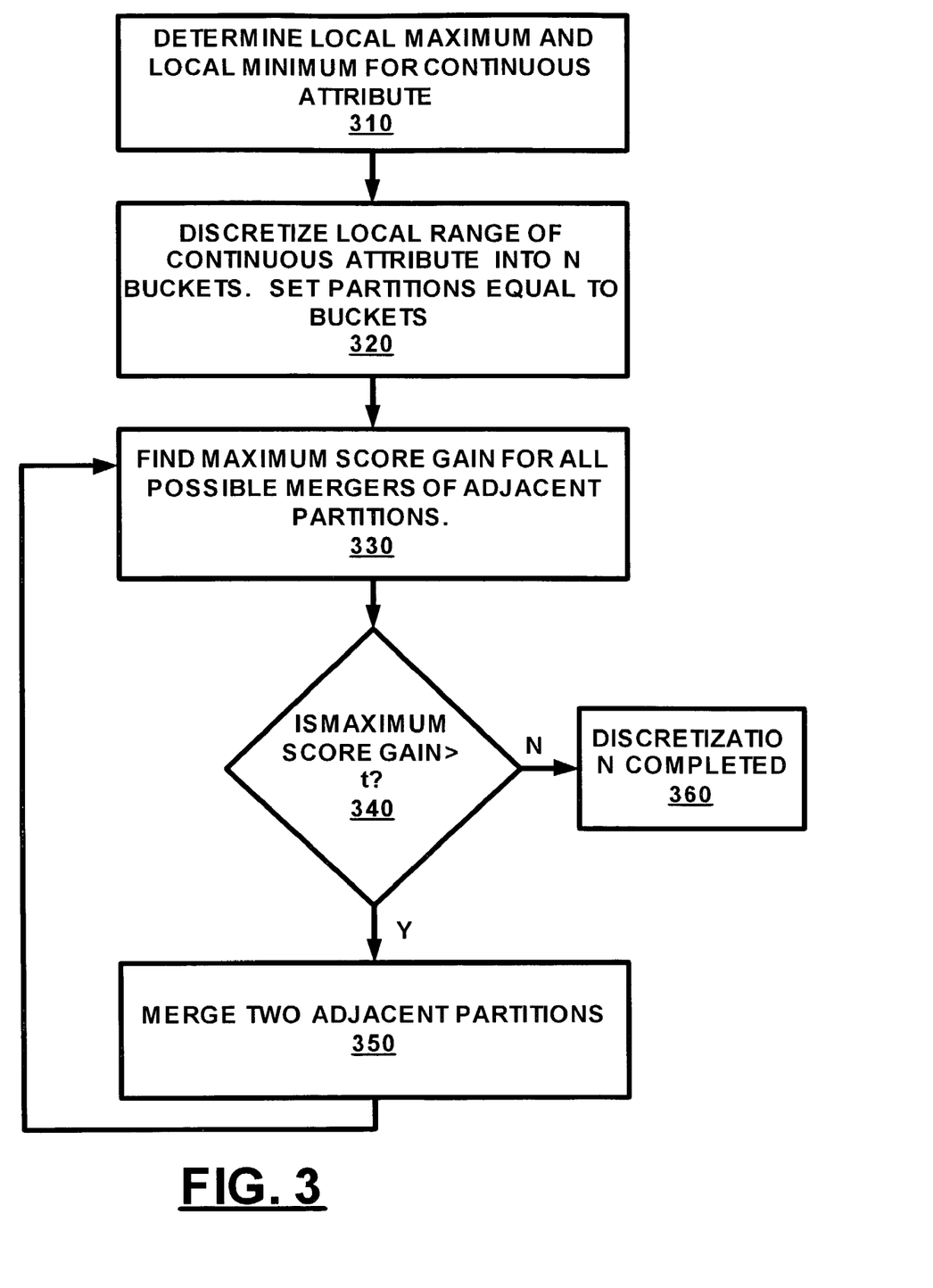
FIG. 3 is a block diagram of one embodiment of the present invention.

Next, the local range of values of X are discretized into some number of equi-range buckets as shown in step 320. The number of buckets may be set, or it may be a training parameter, set before runtime or dynamically during the running of the application, either automatically or by a user. This number of equi-range buckets, N, divides the buckets into ranges of size $(X_{MAX}-X_{MIN})/n$. The buckets are numbered $b_1, b_2, b_3, \ldots b_N$, where bi contains cases with a range from $X_{MIN}+((X_{MAX}-X_{MIN})/N)*i$ to $X_{MIN}+((X_{MAX}-X_{MIN})/N)*(i+1)$. In other embodiments, other means may be use to establish buckets.

Partitions are formed from these buckets. Each partition has one or more consecutive buckets. Partition $P_{i,j}$ is the partition containing all $b_i, b_{i+1}, \ldots, b_j$. Initially, there will be N partitions: $P_{1,1}, P_{2,2}, \ldots P_{N,N}$.

A score for each of the partitions is obtained. Any decision tree scoring algorithm which provides a score for the use of a state of a variable as an attribute test can be used. A score is also obtained for the partition which would be formed from each possible merger of two adjacent partitions. The score for each possible merger $S(P_{A,C})$ is compared to the combined score of the adjacent partitions $S(P_{A,B})$ and $S(P_{B,C})$ which would be merged to find the maximum value for score gain from merger: $S(P_{A,C})-(S(P_{A,B})+S(P_{B,C}))$ This is shown in step 330.

If the score gain from this best merger is greater than some minimum score gain t (comparison 340), the two adjacent partitions are merged in step 350, and other mergers are considered. If the score gain is not greater than a minimum score gain t, then the discretization process is completed, step 360, and all remaining partitions are considered as separate states for the decision tree algorithm.

It should be clear that scores do not need to be recalculated at each step. Once a score $S(P_{A,B})$ is calculated for a partition or for a merged partition, that score can be kept for use in repeated calculations of score gains. Once a score gain is calculated for a certain merger, if that merger does not take place immediately, the score gain can be kept for use in repeated comparisons of that possible merger with other possible mergers. Additionally, it may be possible to perform more than one merger at a time or to consider mergers of more than two adjacent partitions, if such mergers are all preferable.

The value for t, the number of mergers to perform, and which mergers to perform may all be selected in advance or determined dynamically, either automatically or by a user. The value t may be negative. If the value t is negative, a merger may take place even though the merger results in a lower score than the separate partitions that make up the merged partition. This may be desirable if there is a preference for fewer ranges for use as states in the discretized version of the continuous attribute.

Instead of comparing score gains to a value t, a certain number of mergers may be performed. This number may be selected in advanced or determined dynamically, either automatically or by a user.

The dynamic determination of the number of partitions N, the minimum score gain value t, or the maximum number of mergers may be done based on operating or usage parameters of the system on which the decision tree process is occurring, or based on the distribution of training data at the node over the range.

Partition Merger

Figure 4A:
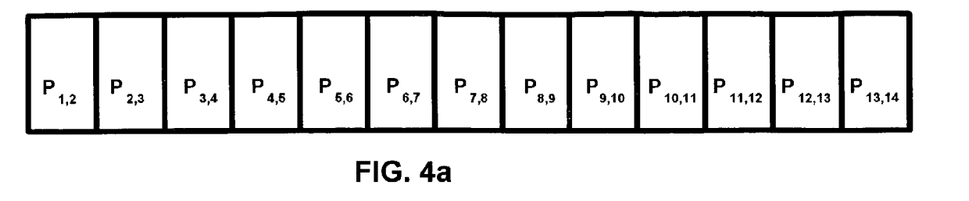
FIGS. 4a, 4b, 4c, 4d, 4e, and 4f are block diagrams of the partitions of a continuous variable at different stages of merger according to one embodiment of the present invention.
Figure 4B:
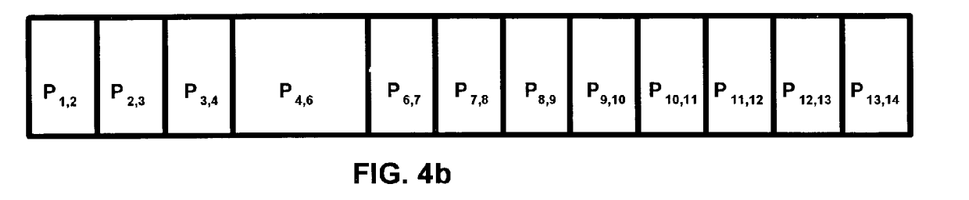

As seen in FIG. 4a, the range of a continuous attribute at a node is divided into 13 buckets of equal range. These buckets become partitions $P_{1,2}$ through $P_{13,14}$. The score gain for each possible partition is calculated. This means score gains for the possible partitions: $P_{1,3}$, $P_{2,4}$, $P_{3,5}$, $P_{4,6}$, $P_{5,7}$, $P_{6,8}$, $P_{7,9}$, $P_{8,10}$, $P_{9,11}$, $P_{10,12}$, $P_{11,13}$, and $P_{12,14}$ are calculated. As shown in FIG. 4b, $P_{4,6}$ is found to give the highest score gain, and the score gain is greater than the minimum score gain t. The partitions $P_{4,5}$ and $P_{5,6}$ are merged. All mergers are again considered. As score gains for $P_{1,3}$, $P_{2,4}$, $P_{6,8}$, $P_{7,9}$, $P_{8,10}$, $P_{9,11}$, $P_{10,12}$, $P_{11,13}$, and $P_{12,14}$ have already been calculated, they do not need to be recalculated. Score gains for $P_{3,6}$ and $P_{4,7}$ are calculated.

Figure 4C:
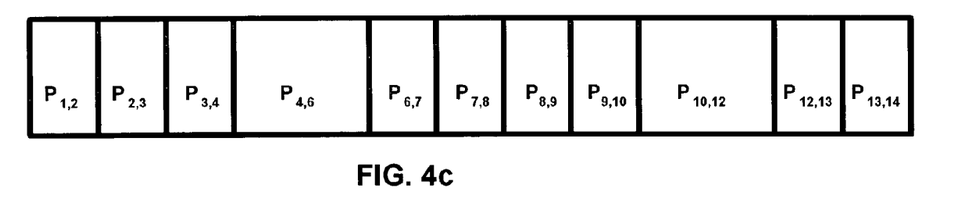
Figure 4D:
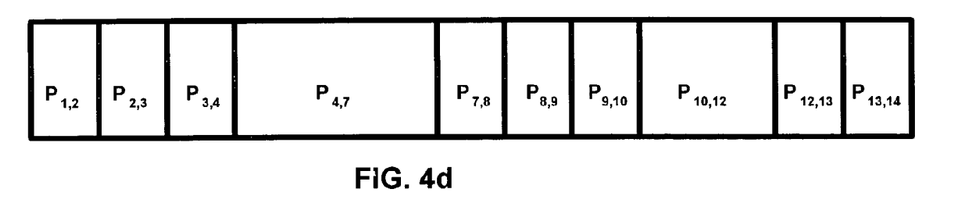
Figure 4E:
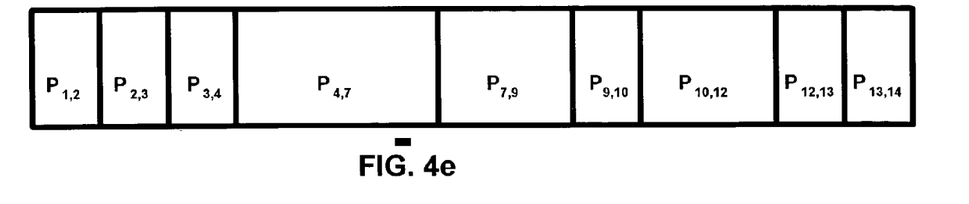
Figure 4F:
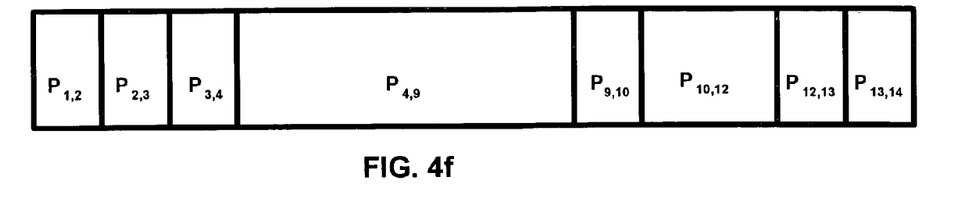

As shown in FIG. 4c, $P_{10,12}$ is found to give the highest score gain, and again, that score gain is greater than the minimum score gain. Partitions $P_{10,11}$ and $P_{11,12}$ are merged. Two new score gains are calculated (for the two possible mergers including the new partition $P_{10,12}$) and, as shown in FIG. 4d, partitions $P_{7,8}$ and $P_{8,9}$ are merged. Two new score gains are calculated, and as shown in FIG. 4e, partitions $P_{4,7}$ and $P_{7,9}$ are merged. When the new score gains are calculated, the highest possible score gain is not greater than the minimum score gain t. Therefore the mergers are completed. The subranges indicated by the partitions which have been formed become the states for the continuous variable, and the continuous variable can be used as an input attribute to the decision tree.

Figure 5:
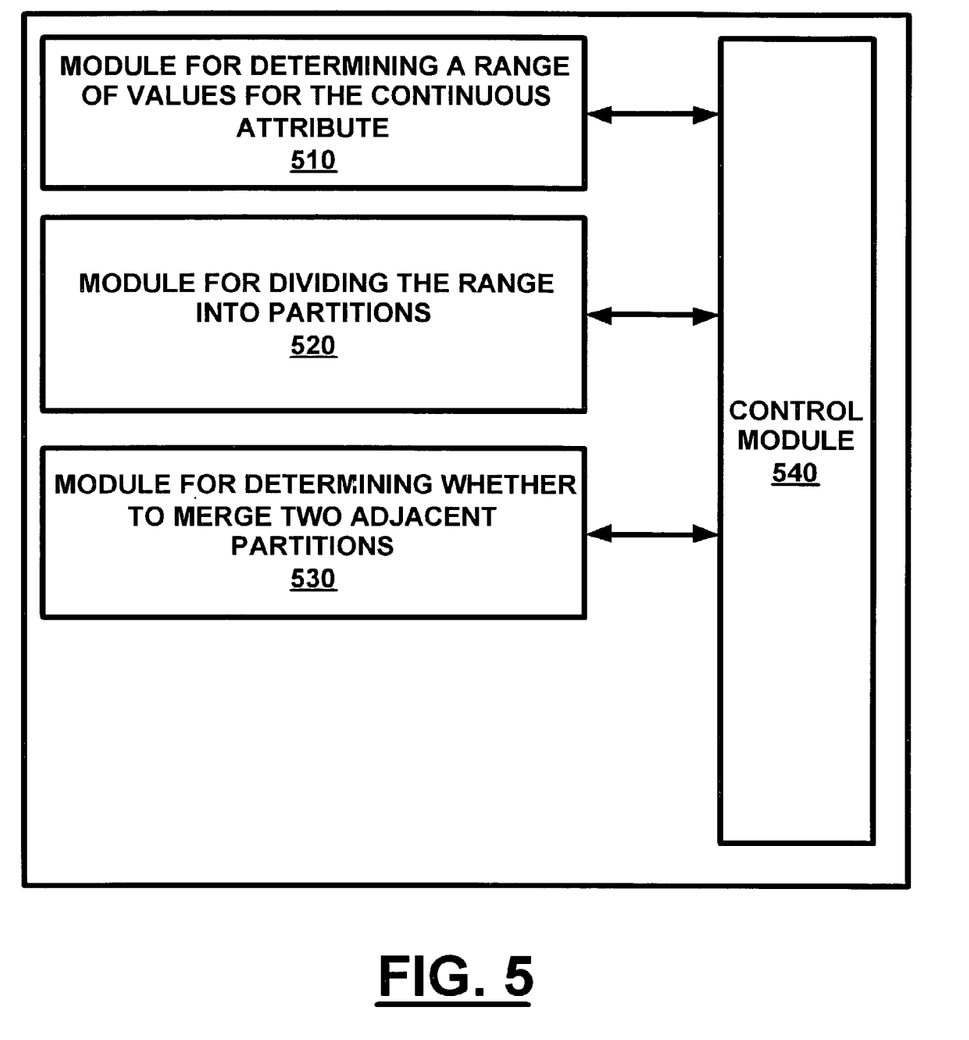
FIG. 5 is a block diagram of a system according to the invention.

As shown in FIG. 5, a system according to this invention includes a module for determining the range of values for the continuous attribute 510, a module for dividing the range into partitions 520, and a module for determining whether to merge adjacent partitions 530. In a preferred embodiment, a control module 540 is also provided which communicates with each of these modules.

CONCLUSION

As mentioned above, while exemplary embodiments of the present invention have been described in connection with various computing devices and network architectures, the underlying concepts may be applied to any computing device or system in which it is desirable to create a decision tree. Thus, the techniques for creating a decision tree in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent parametrization achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method for using a continuous attribute as an input attribute for a decision tree for a given output attribute, where a score can be calculated which corresponds to a measure of the usefulness of a subrange of an input attribute considered as a state over said given output attribute, comprising:
   determining a range of values for said continuous attribute; where said values for said continuous attribute are stored on at least one storage medium;
   dividing said range into partitions, where each partition corresponds to a sub-range of said range;
   determining whether to merge said at least two adjacent partitions, comprising calculating a score gain corresponding to a hypothetical partition resulting from the merger of two adjacent partitions compared to sum of scores for each of said two adjacent partitions; and
   performing a merger based on the step of determining whether to merge.

2. A method according to claim 1, where said determination of a range of values for said continuous attribute comprises determining the range of values of said continuous attribute in a certain percentage of cases in a testing data set.

3. A method according to claim 2, where said percentage is 100%.

4. A method according to claim 2, where said percentage of cases are randomly selected from said testing data set.

5. A method according to claim 1, where said division of said range into partitions comprises dividing said range into a number N of sub-ranges of equal extent.

6. A method according to claim 5, where said number N is dynamically chosen based on information comprising the distribution of the values of said continuous attribute in a certain percentage of cases in a testing data set.

7. A method according to claim 5, where said number N is chosen by a user.

8. A method according to claim 1, where said determination of whether to merge comprises:
   calculating at least two score gains corresponding to at least two possible mergers of at least two adjacent partitions, and
   performing the merger for the one of said at least two possible mergers of at least two adjacent partitions with the highest score gain.

9. A method according to claim 1 where said determination of whether to merge said at least two adjacent partitions comprises:
   determining at least two score gains corresponding to at least two possible mergers of at least two adjacent partitions;
   determining which of said at least two possible mergers results in the highest score gain;
   determining whether said highest score gain is greater than a minimum score gain t; and
   if said highest score gain is greater than said minimum score gain t, performing the merger for the one of said at least two possible mergers of at least two adjacent partitions with the highest score gain.

10. A method according to claim 9, where said minimum score gain t is dynamically chosen based on information comprising the distribution of the values of said continuous attribute in a certain percentage of cases in a testing data set.

11. A method according to claim 9, where said minimum score gain t is chosen by a user.

12. A method according to claim 1 where said determination whether to merge said at least two adjacent partitions comprises:
   determining at least two score gains corresponding to at least two possible mergers of at least two adjacent partitions;
   determining which of said at least two possible mergers results in the highest score gain;
   determining whether a maximum number of mergers have been performed, and, if not, performing the merger for the one of said at least two possible mergers of at least two adjacent partitions with the highest score gain.

13. A method according to claim 12, where said maximum number of mergers is dynamically chosen based on information comprising the distribution of the values of said continuous attribute in a certain percentage of cases in a testing data set.

14. A method according to claim 12, where said maximum number of mergers is chosen by a user.

15. A computer storage medium comprising computer executable modules having computer executable instructions for using a continuous attribute as an input attribute for a decision tree for a given output attribute, where a score can be calculated which corresponds to a measure of the usefulness of a subrange of an input attribute considered as a state over said given output attribute, said modules comprising:
   a module for determining a range of values for said continuous attribute;
   a module for dividing said range into partitions, where each partition corresponds to a sub-range of said range;
   a module for determining whether to merge said at least two adjacent partitions, said determination of whether to merge said at least two adjacent partitions comprising calculating a score gain corresponding to score of a hypothetical partition resulting from the merger of two adjacent partitions compared to a sum of scores for each of said two adjacent partitions; and
   a module for performing a merger based on the determination of whether to merge.

16. A computer storage medium according to claim 15, where said determination of a range of values for said continuous attribute comprises determining the range of values of said continuous attribute in a certain percentage of cases in a testing data set.

17. A computer storage medium according to claim 16, where said percentage is 100%.

18. A computer storage medium according to claim 16, where said percentage of cases are randomly selected from said testing data set.

19. A computer storage medium according to claim 15, where said division of said range into partitions comprises dividing said range into a number N of sub-ranges of equal extent.

20. A computer storage medium according to claim 19, where said number N is dynamically chosen based on information comprising the distribution of the values of said continuous attribute in a certain percentage of cases in a testing data set.

21. A computer storage medium according to claim 19, where said number N is chosen by a user.

22. A computer storage medium according to claim 15 where said module for determining whether to merge said at least two adjacent partitions comprises:
   a module for calculating at least two score gains corresponding to at least two possible mergers of at least two adjacent partitions, and
   a module for performing the merger for the one of said at least two possible mergers of at least two adjacent partitions with the highest score gain.

23. A computer storage medium according to claim 15 where said module for determining whether to merge said at least two adjacent partitions comprises:
   a module for determining at least two score gains corresponding to at least two possible mergers of at least two adjacent partitions;
   a module for determining which of said at least two possible mergers results in the highest score gain;
   a module for determining whether said highest score gain is greater than a minimum score gain t; and
   a module for, if said highest score gain is greater than said minimum score gain t, performing the merger for the one of said at least two possible mergers of at least two adjacent partitions with the highest score gain.

24. A computer storage medium according to claim 23, where said minimum score gain t is dynamically chosen based on information comprising the distribution of the values of said continuous attribute in a certain percentage of cases in a testing data set.

25. A computer storage medium according to claim 23, where said minimum score gain t is chosen by a user.

26. A computer storage medium according to claim 15 where said module for determining whether to merge said at least two adjacent partitions comprises:
   a module for determining at least two score gains corresponding to at least two possible mergers of at least two adjacent partitions;
   a module for determining which of said at least two possible mergers results in the highest score gain;
   a module for determining whether a maximum number of mergers have been performed, and, if not, performing the merger for the one of said at least two possible mergers of at least two adjacent partitions with the highest score gain.

27. A computer storage medium according to claim 26, where said maximum number of mergers is dynamically chosen based on information comprising the distribution of the values of said continuous attribute in a certain percentage of cases in a testing data set.

28. A computer storage medium according to claim 26, where said maximum number of mergers is chosen by a user.

29. A computer device for using a continuous attribute as an input attribute for a decision tree for a given output attribute, Where a score can be calculated which corresponds to a measure of the usefulness of a subrange of an input attribute considered as a state over said given output attribute, comprising:
   means for determining a range of values for said continuous attribute;
   means for dividing said range into partitions, where each partition corresponds to a sub-range of said range;
   means for determining whether to merge said at least two adjacent partitions, said means comprising means for calculating a score gain corresponding to a score of a hypothetical partition resulting from the merger of two adjacent partitions compared to a sum of scores for each of said two adjacent; and
   means for performing a merger based on the determining of whether to merge.

30. A computer device according to claim 29, where said determination of a range of values for said continuous attribute comprises determining the range of values of said continuous attribute in a certain percentage of cases in a testing data set.

31. A computer device according to claim 30, where said percentage is 100%.

32. A computer device according to claim 30, where said percentage of cases are randomly selected from said testing data set.

33. A computer device according to claim 29, where said division of said range into partitions comprises dividing said range into a number N of sub-ranges of equal extent.

34. A computer device according to claim 33, where said number N is dynamically chosen based on information comprising the distribution of the values of said continuous attribute in a certain percentage of cases in a testing data set.

35. A computer device according to claim 33, where said number N is chosen by a user.

36. A computer device according to claim 29 where said means for determining whether to merge said at least two adjacent partitions comprises:
   means for calculating at least two score gains corresponding to at least two possible mergers of at least two adjacent partitions, and
   means for performing the merger for the one of said at least two possible mergers of at least two adjacent partitions with the highest score gain.

37. A computer device according to claim 29 where said means for determining of whether to merge said at least two adjacent partitions comprises:
   means for determining at least two score gains corresponding to at least two possible mergers of at least two adjacent partitions;
   means for determining which of said at least two possible mergers results in the highest score gain;
   means for determining whether said highest score gain is greater than a minimum score gain t; and
   means for, if said highest score gain is greater than said minimum score gain t, performing the merger for the one of said at least two possible mergers of at least two adjacent partitions with the highest score gain.

38. A computer device according to claim 37, where said minimum score gain t is dynamically chosen based on information comprising the distribution of the values of said continuous attribute in a certain percentage of cases in a testing data set.

39. A computer device according to claim 37, where said minimum score gain t is chosen by a user.

40. A computer device according to claim 29 where said means for determining whether to merge said at least two adjacent partitions comprises:

means for determining at least two score gains corresponding to at least two possible mergers of at least two adjacent partitions;

means for determining which of said at least two possible mergers results in the highest score gain;

means for determining whether a maximum number of mergers have been performed, and, if not, performing the merger for the one of said at least two possible mergers of at least two adjacent partitions with the highest score gain.

41. A computer device according to claim 40, where said maximum number of mergers is dynamically chosen based on information comprising the distribution of the values of said continuous attribute in a certain percentage of cases in a testing data set.

42. A computer device according to claim 40, where said maximum number of mergers is chosen by a user.

* * * * *